United States Patent
Misawa et al.

(10) Patent No.: US 9,815,230 B2
(45) Date of Patent: Nov. 14, 2017

(54) IMPRINT MOLD MANUFACTURING METHOD, IMPRINT MOLD, AND IMPRINT MOLD MANUFACTURING KIT

(71) Applicant: SOKEN CHEMICAL & ENGINEERING Co., Ltd., Tokyo (JP)

(72) Inventors: Takehide Misawa, Saitama (JP); Ikumi Sakata, Saitama (JP)

(73) Assignee: SOKEN CHEMICAL & ENGINEERING Co., Ltd., Tokyo (JP)

(*) Notice: Subject to any disclaimer, the term of this patent is extended or adjusted under 35 U.S.C. 154(b) by 312 days.

(21) Appl. No.: 14/443,311

(22) PCT Filed: Nov. 18, 2013

(86) PCT No.: PCT/JP2013/081011
§ 371 (c)(1),
(2) Date: May 15, 2015

(87) PCT Pub. No.: WO2014/080857
PCT Pub. Date: May 30, 2014

(65) Prior Publication Data
US 2015/0290847 A1  Oct. 15, 2015

(30) Foreign Application Priority Data

Nov. 22, 2012  (JP) .................... 2012-256546

(51) Int. Cl.
*B29C 59/04* (2006.01)
*B29C 41/36* (2006.01)
(Continued)

(52) U.S. Cl.
CPC .......... *B29C 41/36* (2013.01); *B29C 33/3842* (2013.01); *B29C 33/3878* (2013.01);
(Continued)

(58) Field of Classification Search
CPC ... B29C 59/02; B29C 59/04; B29C 2059/023; B29C 33/3878; B29C 33/424;
(Continued)

(56) References Cited

U.S. PATENT DOCUMENTS 5,383,834 A    1/1995 Kanome et al.
2001/0032703 A1    10/2001 Paulson et al.
(Continued)

FOREIGN PATENT DOCUMENTS

JP    05205322 A    8/1993
JP    2002524298 A    8/2002
(Continued)

OTHER PUBLICATIONS

Chinese Office Action dated Apr. 5, 2016, in connection with corresponding CN Application No. 201380060898.5 (10 pgs., including English translation).
(Continued)

*Primary Examiner* — Carson Gross
(74) *Attorney, Agent, or Firm* — Maier & Maier, PLLC

(57) ABSTRACT

A method for manufacturing an imprint mold which can prevent accumulation of the transferring resin at the joining portion of the film mold is provided. A method for manufacturing an imprint mold, including a winding step to wind a resin film mold onto a cylindrical transferring roll, the resin film mold being provided with a reverse pattern of a desired fine concave-convex pattern and the resin film mold being wound onto the transferring roll so that a gap without the reverse pattern is provided at a butting portion of both ends of the resin film mold; a resin filling step to fill a resin composition into the gap; and a pattern forming step to form a pattern substantially the same as the reverse pattern onto the resin composition, is provided.

8 Claims, 5 Drawing Sheets

(51) Int. Cl.
- *B29C 33/38* (2006.01)
- *B29D 99/00* (2010.01)
- *B29C 33/42* (2006.01)
- *B29C 53/56* (2006.01)
- *B05D 3/06* (2006.01)
- *B29C 59/02* (2006.01)
- *B29C 35/08* (2006.01)
- *B29L 31/00* (2006.01)
- *B29C 37/00* (2006.01)

(52) U.S. Cl.
CPC .......... *B29C 59/04* (2013.01); *B29D 99/0035* (2013.01); *B05D 3/067* (2013.01); *B29C 33/424* (2013.01); *B29C 37/0067* (2013.01); *B29C 53/562* (2013.01); *B29C 59/02* (2013.01); *B29C 2033/385* (2013.01); *B29C 2035/0827* (2013.01); *B29C 2059/023* (2013.01); *B29L 2031/757* (2013.01)

(58) Field of Classification Search
CPC ............ B29C 2035/0827; B29C 53/56; B29C 53/562; B29C 2033/385; B05D 3/067; B29D 99/0035; B29L 2031/757
See application file for complete search history.

(56) References Cited

U.S. PATENT DOCUMENTS

| | | | |
|---|---|---|---|
| 2008/0299247 A1* | 12/2008 | Ogino | B29C 33/3878 425/471 |
| 2010/0203183 A1 | 8/2010 | Choi et al. | |

FOREIGN PATENT DOCUMENTS

| | | |
|---|---|---|
| JP | 2003181918 A | 7/2003 |
| JP | 2008296466 A | 12/2008 |
| JP | 2010005866 A | 1/2010 |
| WO | 2011049097 A1 | 4/2011 |
| WO | 2013031460 A1 | 3/2013 |

OTHER PUBLICATIONS

International Search Report dated Jan. 7, 2014 from corresponding International Patent Application No. PCT/JP2013/081011; 2pgs.

* cited by examiner

[FIG. 1]
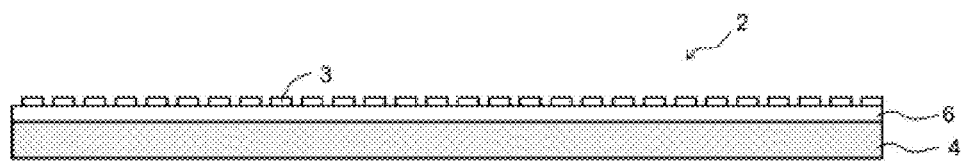
[FIG. 2]

[FIG. 3]
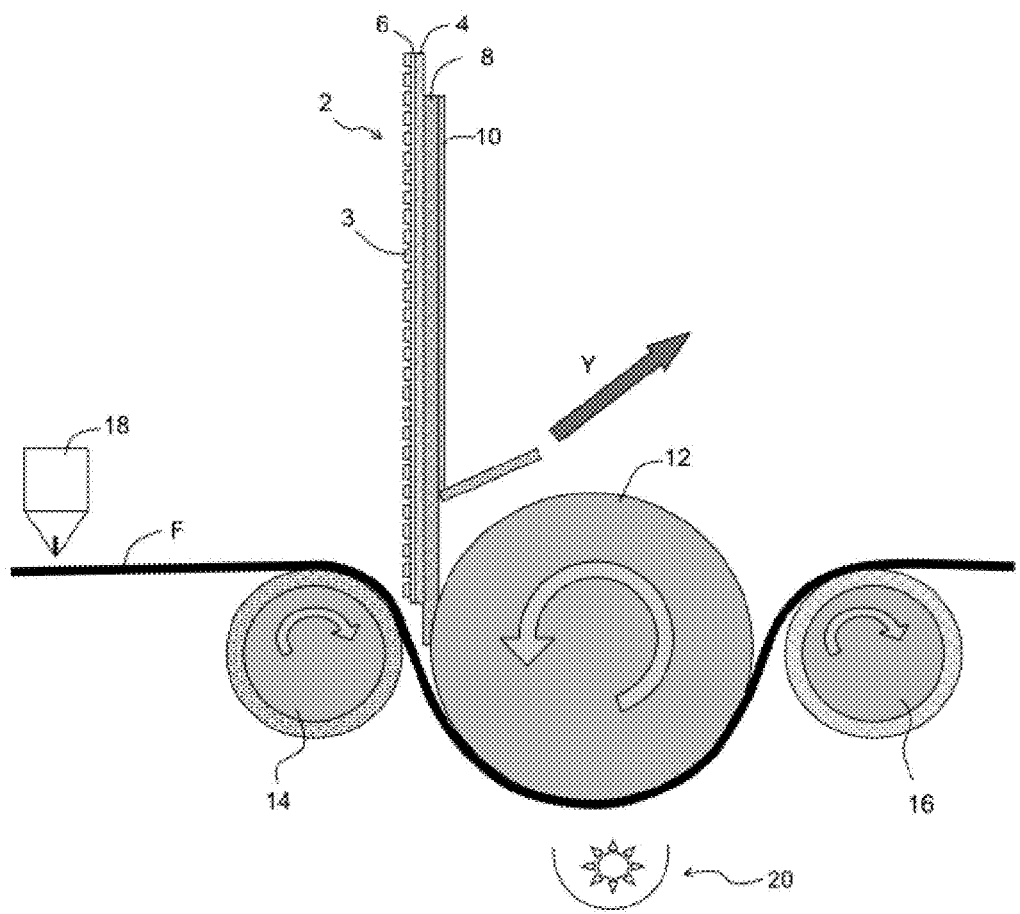
[FIG. 4]
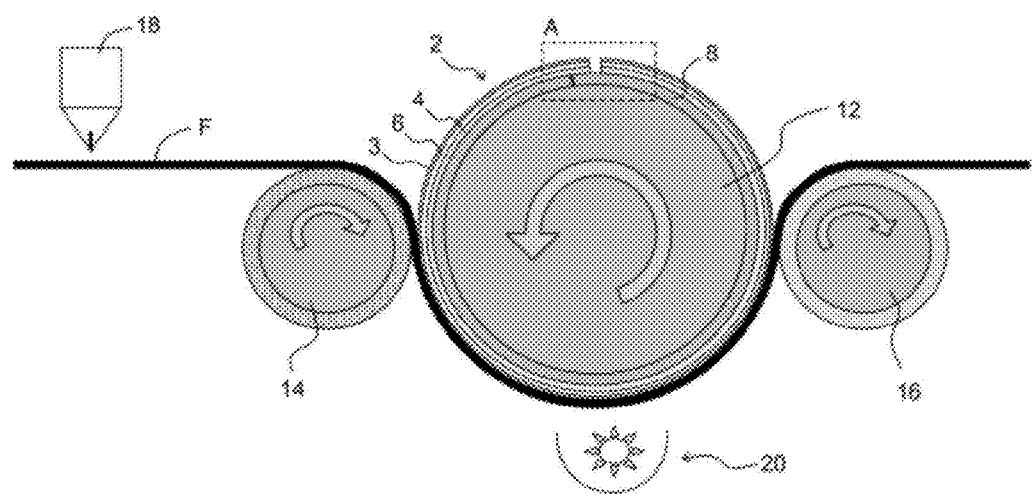

[FIG. 5]
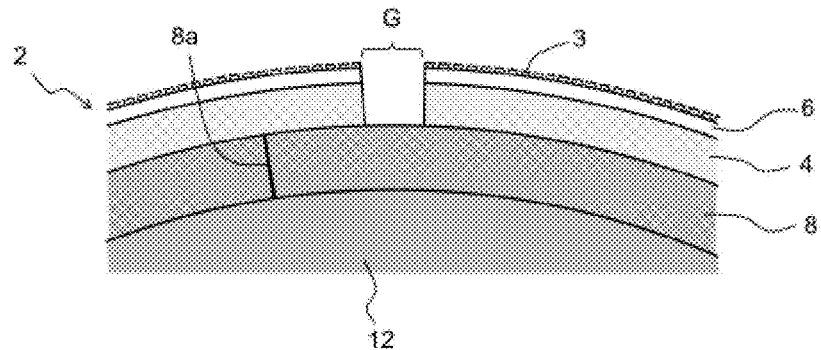
[FIG. 6]
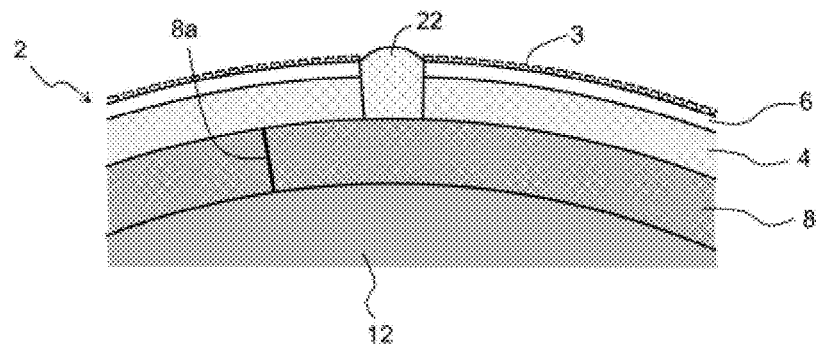
[FIG. 7]
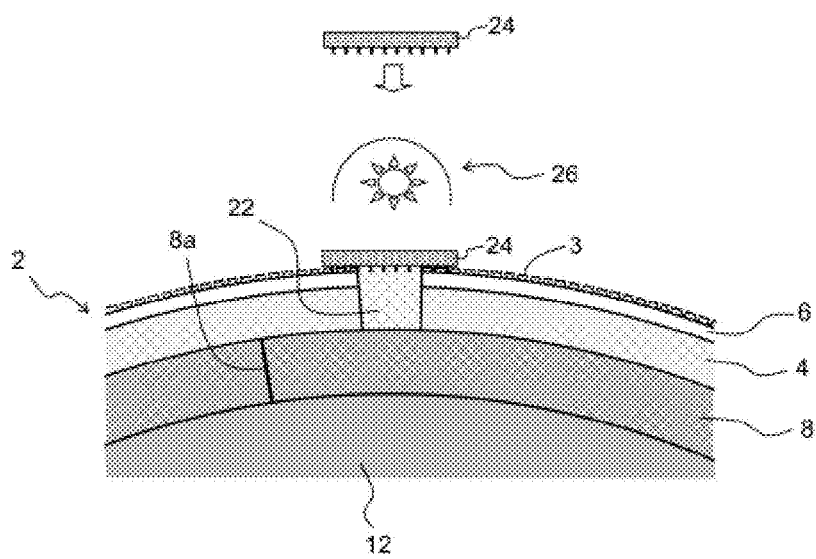

[FIG. 8]
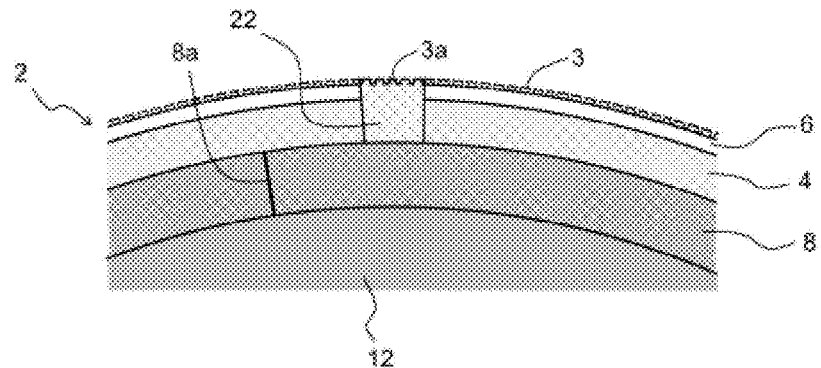
[FIG. 9]
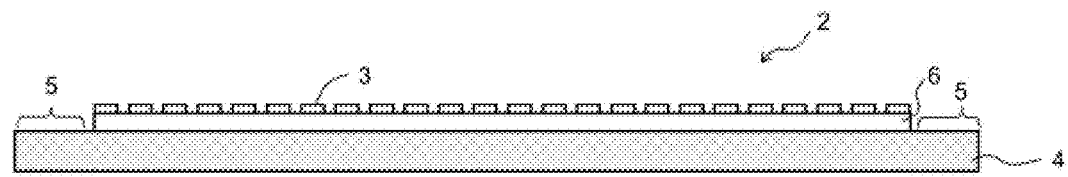
[FIG. 10]
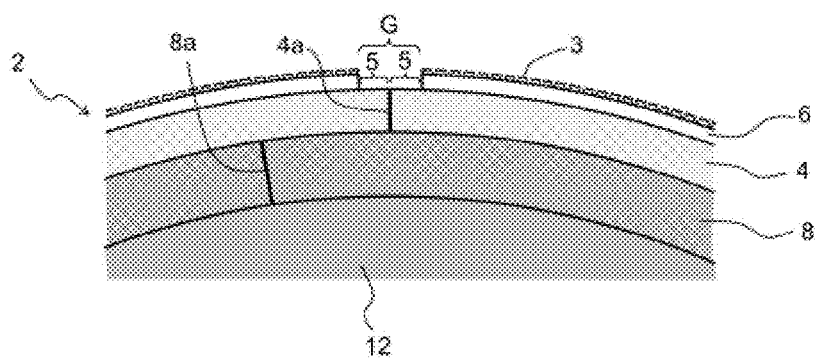
[FIG. 11]
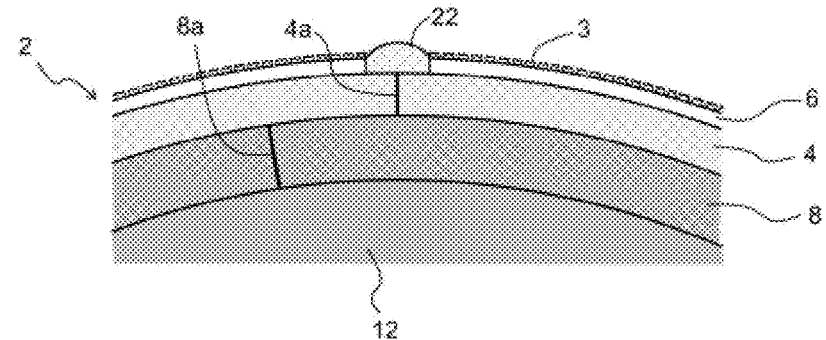

[FIG. 12]
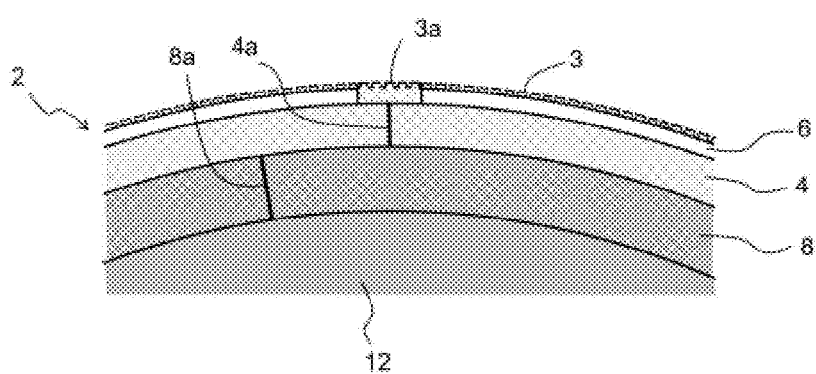

IMPRINT MOLD MANUFACTURING METHOD, IMPRINT MOLD, AND IMPRINT MOLD MANUFACTURING KIT

TECHNICAL FIELD

The present invention relates to a method for manufacturing an imprint mold, an imprint mold, and an imprint mold manufacturing kit.

BACKGROUND

Imprint technology is a fine processing technology, which uses a mold having a reverse pattern of the desired fine concave-convex pattern. The mold is pressed against a transferring material on a substrate, thereby transferring the reverse pattern of the mold onto the transferring material. Here, the transferring material is a liquid resin for example. The reverse pattern of the fine concave-convex pattern can vary between a nano-scale pattern of 10 nm-level size to a 100 μm-level size. The reverse pattern is used in a wide range of field including semiconductor materials, optical materials, recording media, micro machines, biotechnology, and environmental protection.

With respect to a transferring method to transfer the reverse pattern onto the transferring material, an imprint mold in the form of a roll manufactured by winding a film mold onto a transferring roll, or a metal roll manufactured by carving out a metal can be used. These rolls are used in the roll to roll method to continuously transfer the reverse pattern onto the transferring material.

In order to prepare the imprint mold in the form of a roll from the film mold, both ends of the film mold need be joined. As a method for joining the film mold, Patent Literature 1 discloses a technique in which the edge portions of the butted resin film are sandwiched with a pair of heaters, thereby pressure-fusing the edge portion; and a technique in which the edge portions of the resin film to be joined are overlapped, followed by pressure-fusion of the portion to be joined.

CITATION LIST

Patent Literature

Patent Literature 1: WO2011/049097

SUMMARY OF THE INVENTION

Problems to be Solved by the Invention

However, when the end portions of the resin film were butted with each other and pressure-fused, the joining portion cannot be joined sufficiently, thereby resulting in a problematic circumstance where the joining portion separates later, or the transferring resin accumulating at the joining portion.

On the other hand, when the end portions of the resin film to be joined are partially overlapped and then pressure-fused, joining property can be improved; however, the joining portion would be uneven, resulting in a problematic circumstance where the transferring resin accumulates at the uneven portion.

The present invention has been made by taking the aforementioned circumstances into consideration. An object of the present invention is to provide a method for manufacturing an imprint mold which can prevent accumulation of the transferring resin at the joining portion of the film mold.

Means to Solve the Problem

According to the present invention, a method for manufacturing an imprint mold, comprising: a winding step to wind a resin film mold onto a cylindrical transferring roll, the resin film mold being provided with a reverse pattern of a desired fine concave-convex pattern and the resin film mold being wound onto the transferring roll so that a gap without the reverse pattern is provided at a butting portion of both ends of the resin film mold; a resin filling step to fill a resin composition into the gap; and a pattern forming step to form a pattern substantially the same as the reverse pattern onto the resin composition, is provided.

With such method for joining the film mold, the butting portion at the end of the film mold can be joined firmly. In addition, since the resin composition is filled in the gap at the butting portion, the resin of the transferring material would not get into the gap. Further, since the joining is conducted certainly, defects such as partial peeling off of the joining portion can be prevented.

In a case where the resin composition is merely filled in the gap, the reverse pattern would not be formed on such portion. Accordingly, the resulting concave-convex pattern transferred to the transferring material would have a streak-like non-transferring portion corresponding to the gap at the butting portion. On the contrary, in the present invention, the resin composition is also formed with a pattern substantially the same as the reverse pattern. Accordingly, the non-transferring portion would not appear, and a continuous concave-convex pattern can be transferred.

Hereinafter, various embodiments of the present invention will be exemplified. The embodiments provided hereinafter can be combined with each other.

Preferably, the resin composition is a photo-curing resin; and the pattern is formed in the pattern forming step by irradiating the resin composition with light in a condition where a pattern adding mold is pressed against the resin composition, the pattern adding mold having a pattern substantially the same as the concave-convex pattern.

Preferably, the pattern adding mold is transparent with respect to the light; and the resin composition is irradiated with the light through the pattern adding mold.

Preferably, the winding step is carried out by adhering one side of a double-sided adhesive tape onto the film mold, followed by adhering the other side of the double-sided adhesive tape onto the transferring roll.

Preferably, an end portion of the double-sided adhesive tape and an end portion of the film mold are shifted from each other with respect to a winding direction of the film mold.

Preferably, the resin composition is a releasing resin.

According to another aspect of the present invention, an imprint mold, comprising: a cylindrical transferring roll; and a resin film mold wound onto the transferring roll, the resin film mold being provided with a reverse pattern of a desired fine concave-convex pattern; wherein the film mold is wound onto the transferring roll so that a gap without the reverse pattern is provided at a butting portion of both ends of the resin film mold; and a resin composition is filled into the gap, the resin composition being provided with a pattern substantially the same as the reverse pattern, is provided.

According to further another aspect of the present invention, An imprint mold manufacturing kit, comprising: a resin film mold provided with a reverse pattern of a desired fine concave-convex pattern; a resin composition filled into a gap provided when the film mold is wound onto a cylindrical roll, the gap being provided at a butting portion of both ends of the film mold; and a pattern adding mold to form a pattern substantially the same as the reverse pattern onto the resin composition, is provided.

BRIEF DESCRIPTION OF THE DRAWINGS

FIG. 1 is a cross sectional view of a film mold according to the first embodiment of the present invention.

FIG. 2 is a cross sectional view showing the film mold of FIG. 1 having a double-sided adhesive tape adhered thereon.

FIG. 3 is a cross sectional view showing a step in which the film mold with the double-sided adhesive tape of FIG. 2 is being wound onto the transferring roll.

FIG. 4 is a cross sectional view showing the step following the step of FIG. 3, in which the film mold is wound onto the transferring roll.

FIG. 5 is an enlarged view of region A in FIG. 4.

FIG. 6 is a view following FIG. 5, in which the gap at the butting portion of the both ends of the film mold is filled with the resin composition.

FIG. 7 is a view following FIG. 6, in which a pattern is being formed on the resin composition.

FIG. 8 is a view following FIG. 7, in which the pattern is formed on the resin composition.

FIG. 9 is a cross sectional view of a film mold according to the second embodiment of the present invention.

FIG. 10 is view corresponding to FIG. 5, in a case where the film mold of FIG. 9 is used.

FIG. 11 is a view following FIG. 10, in which the gap at the butting portion of the both ends of the film mold is filled with the resin composition.

FIG. 12 is a view following FIG. 11, in which the pattern is formed on the resin composition.

DESCRIPTION OF EMBODIMENTS

Hereinafter, the preferred embodiments of the present invention will be described specifically with reference to the drawings.

1. First Embodiment

The method for manufacturing the imprint mold according to the first embodiment of the present invention will be described with reference to FIGS. 1 to 8. The method for manufacturing the imprint mold according to the present embodiment comprises a winding step to wind a resin film mold 2 onto a cylindrical transferring roll 12, the resin film mold 2 being provided with a reverse pattern 3 of a desired fine concave-convex pattern and the resin film mold 2 being wound onto the transferring roll 12 so that a gap G without the reverse pattern 3 is provided at a butting portion of both ends of the resin film mold 2; a resin filling step to fill a resin composition 22 into the gap G; and a pattern forming step to form a pattern 3a substantially the same as the reverse pattern 3 onto the resin composition 22.

Hereinafter, each of the steps will be described in detail.

1-1. Winding Step

In this step, as shown in FIGS. 1 to 5, the film mold 2 made of resin having formed thereon the reverse pattern 3 of the desired fine concave-convex pattern is wound onto the cylindrical transferring roll 12 so as to form a gap G at the butting portion of both ends, the gap G having no reverse pattern 3.

(1) Film Mold 2

Film mold 2 can be formed using a conventional imprint technology. In one example, as shown in FIG. 1, the film mold 2 comprises a flexible resin substrate 4, and a resin layer 6 having the reverse pattern 3 of the desired fine concave-convex pattern, the resin layer 6 being provided on the resin substrate 4.

Specifically, the resin substrate 4 is made of one type of a resin selected from the group consisting of polyethylene terephthalate, polycarbonate, polyester, polyolefin, polyimide, polysulphone, polyether sulfone, cyclic polyolefin, and polyethylene naphthalate.

On the other hand, as the resin for forming the resin layer 6, a thermoplastic resin, a thermosetting resin, and a photo-curing resin can be mentioned. As the resin, an acryl-based resin, a styrene-based resin, an olefin-based resin, a polycarbonate resin, a polyester-based resin, an epoxy resin, a silicon-based resin, and a mixture thereof can be mentioned.

The thickness of the resin layer 6 is usually 50 nm to 1 mm, preferably 500 nm to 500 μm. When the thickness of the resin layer 6 is in such range, imprint process can be performed without difficulty.

When the resin forming the resin layer 6 is a thermoplastic resin, a mold for forming the reverse pattern is pressed against the resin layer 6 with a pressing pressure of 0.5 to 50 MPa for 10 to 600 seconds while the resin layer 6 is kept under heating at a temperature higher than the glass transition temperature (Tg). Subsequently, the resin layer 6 is cooled to a temperature below Tg, followed by separation of the mold from the resin layer 6. Accordingly, the reverse pattern 3 is formed on the resin layer 6. On the other hand, when the resin forming the resin layer 6 is a photo-curing resin, the mold for forming the reverse pattern is pressed against the resin layer 6 in the form of a liquid, and then the resin layer 6 is irradiated with curing light (general term for energy ray capable of curing the resin such as UV light, visible light, electron beam and the like) to cure the resin layer 6. Subsequently, the mold is separated to give the resin layer 6 having the reverse pattern 3. The resin layer 6 can be irradiated with the light from the resin substrate 4 side, or from the mold side when the mold is transparent with respect to the light. In addition, when the resin forming the resin layer 6 is a thermosetting resin, the resin layer 6 is heated up to the curing temperature in a condition where the mold for forming the reverse pattern is pressed against the resin layer 6 in the form of a liquid, thereby curing the resin layer 6. Subsequently, the mold is separated from the resin layer 6 to give the resin layer 6 having the reverse pattern 3.

There is no particular limitation regarding the surface pattern of the resin layer 6 (reverse pattern 3 of the concave-convex pattern). Here, a pattern having an interval of 10 nm to 2 mm and a depth of 10 nm to 500 μm is preferable, and a pattern having an interval of 20 nm to 20 μm and a depth of 50 nm to 1 μm is more preferable. When the pattern is regulated in such range, reverse pattern 3 of the concave-convex pattern can be sufficiently transferred to the transferring body. As the surface pattern, moth-eye, line, cylinder, monolith, cone, polygonal pyramid, and microlens can be mentioned.

The surface of the resin layer 6 can be subjected to a releasing treatment to prevent the resin layer 6 from adhering with the transferring body. Here, the releasing treatment can include forming of a releasing layer (not shown). The releasing agent for forming the releasing layer (not shown)

preferably comprises at least one type selected from the group consisting of a fluorosilane coupling agent, a perfluoro compound having an amino group or a carboxyl group, and a perfluoroether compound having an amino group or a carboxyl group. More preferably, the releasing agent comprises at least one type selected from the group consisting of a fluorosilane coupling agent, a one-end-aminated perfluoro(perfluoroether) compound, and a one-end-carboxylated perfluoro(perfluoroether) compound, either as a single compound or a mixture of single compound and multiple compounds. When the releasing agent as described above is used, the adhesion property of the releasing layer formed by the releasing agent with the resin layer 6 would be excellent, and the releasing property of the resin for imprint from the releasing layer formed by the releasing agent would be excellent. The thickness of the releasing layer (not shown) is preferably 0.5 to 20 nm, more preferably 0.5 to 10 nm, and most preferably 0.5 to 5 nm. Here, in order to improve the adhesion between the releasing layer and the resin layer 6, the resin layer 6 can be added with an additive having a functional group capable of bonding with the releasing agent, as disclosed in WO 2012/018045.

In addition, regarding the resin forming the resin layer 6, when the resin layer 6 contains a releasing component by using a silicone resin such as polydimethylsiloxane (PDMS), copolymer of acryl-based monomer and silicone-based monomer, copolymer of acryl-based monomer and fluorine-based monomer, mixture of acryl-based polymer and silicone-based monomer, or a mixture of acryl-based polymer and fluorine-based monomer, the step of forming the releasing layer can be omitted, and thus it is preferable.

The length of the film mold 2 is preferably slightly shorter than the outer circumference length of the transferring roll 12 onto which the film mold 2 is wound. In such case, a gap G will be formed at the butting portion of both ends of the film mold 2 when the film mold 2 is would onto the transferring roll 12. Accordingly, by filling a resin composition 22 into the gap G followed by forming of the reverse pattern 3 and curing of the resin composition 22, the butting portion of both ends of the film mold 2 can be joined firmly, and the reverse pattern 3 which continuously extends throughout the entire circumference of the transferring roll 12 can be formed.

(2) Double-Sided Adhesive Tape

The film mold 2 cannot be adhered onto the transferring roll 12 as it is, and thus it is necessary to wind the film mold 2 onto the transferring roll 12 after coating an adhesive agent onto the surface of the film mold to be attached with the transferring roll 12, or to adhere a double-sided adhesive tape 8 onto the surface of the film mold 2 to be attached with the transferring roll 12 and then wind the film mold 2 onto the transferring roll 12 through the double-sided adhesive tape 8 (as shown in FIG. 2). Since the latter procedure is preferable in terms of workability, explanation is given for the double-sided adhesive tape 8 suitably used in the present embodiment. Here, the surface of the double-sided adhesive tape 8 to be adhered onto the roll is provided with a separator 10 for protecting the adhesive layer of the double-sided adhesive tape 8.

There is no particular limitation regarding the structure of the double-sided adhesive tape 8, so long as the film mold 2 can be adhered onto the transferring roll 12. In a typical case, a polyethylene terephthalate film (not shown) is used as a core material, and it is preferable that the adhesion strength at the surface to be adhered onto the film mold 2 (hereinafter referred to as "mold adhering surface") is higher than the adhesion strength at the surface to be adhered onto the transferring roll 12 (hereinafter referred to as "roll adhering surface"). In addition, it is preferable that the roll adhering surface is re-releasable. After adhering the film mold 2 onto the transferring roll 12 through the double-sided adhesive tape 8, the double-sided adhesive tape 8 and the film mold 2 are removed together and disposed. Accordingly, it is preferable that the adhesion strength of the mold adhering surface of the double-sided adhesive tape 8 is high as possible, in order to prevent displacement of the double-sided adhesive tape 8 and the film mold 2. On the other hand, the adhesion strength of the roll adhering surface of the double-sided adhesive tape 8 is preferably in the range so as to allow easy removal from the transferring roll 12 after usage, that is, strong enough to assure usage while being re-releasable. The thickness of the film as the core material is preferably in the range of 12 to 100 µm. When the thickness is less than 12 µm, the workability during the adhesion of the film mold 2 onto the transferring roll 12 would decrease. On the other hand, when the thickness exceeds 100 µm, the elasticity of the film increases and the film mold 2 would tend to rise apart from the transferring roll 12, and thus it is unfavorable. The adhesive agent layer is preferably structured with an acryl-based adhesive agent composition in terms of cost and workability. There is no particular limitation regarding the acryl-based adhesive agent composition. For example, the ones having an additive such as a crosslinker formulated into the acryl-based polymer can be mentioned. The thickness of the adhesive agent layer is generally in the range of 5 to 50 µm regarding both of the mold adhering surface and the roll adhering surface. When the thickness is in such range, the adhesive agent can function as a buffer material, and is thus preferable since it can improve the transferring accuracy.

The end portion of the double-sided adhesive tape 8 and the film mold 2 in the direction of winding can aligned, but is preferably shifted. In such case, the position of the butting portion of both ends of the double-sided adhesive tape 8 and the butting portion of both ends of the film mold 2 can be shifted when the film mold 2 is wound onto the transferring roll 12 through the double-sided adhesive tape 8. Accordingly, the resin composition 22 filled into the butting portion of both ends of the film mold 2 can be filled into the portion other than the butting portion of the double-sided adhesive tape 8, thereby preventing the resin composition 22 from adhering with the transferring roll 12.

The length of the double-sided adhesive tape 8 is preferably substantially the same as the outer circumference length of the transferring roll 12. In such case, the double-sided adhesive tape 8 can be adhered onto the entire circumference of the transferring roll 12 without any gap. Accordingly, when the length of the film mold 2 is slightly shorter than the outer circumference length of the transferring roll 12, the double-sided adhesive tape 8 would be slightly longer than the film mold 2.

There is no particular limitation regarding the structure of the separator 10, so long as it can protect the adhesive agent layer at the roll adhering surface of the double-sided adhesive tape 8, and can be easily removed when winding the film mold 2 onto the transferring roll 12.

(3) Winding of Film Mold 2 onto Transferring Roll 12

Next, the method for winding the film mold 2 onto the transferring roll 12 will be described in detail. Here, a case where an apparatus as shown in FIG. 3 is used will be explained as an example. However, the structure of the apparatus is not limited to such, and the method for winding is also not limited to the one described herein.

FIG. 3 shows an imprint apparatus for imprinting a concave-convex pattern onto a transferring material. The film mold 2 is wound onto the transferring roll 12, usually in a condition where the transferring roll 12 is arranged in the imprint apparatus. The apparatus comprises a transferring roll 12 to wind the film mold 2 thereon; an upper stream roll 14 to insert the film mold 2 in between the transferring roll 12 and a conveying film F, the upper stream roll 14 being arranged at the upper stream side of the transferring roll 12; and a lower stream roll 16 arranged at the lower stream side of the transferring roll 12. A forwarding roll (not shown) to forward the conveying film F is further arranged at the upper stream side of the upper stream roll 14, and a winding roll (not shown) to wind the conveying film F is further arranged at the lower stream side of the lower stream roll 16. In addition, a coater 18 (a die coater for example) to coat the transferring material (photo-curing resin for example) onto the conveying film is arranged in between the forwarding roll and the upper stream roll 14, and a light irradiator 20 (UV light for example) to cure the transferring material is arranged at the lower stream side of the transferring roll 12. When the film mold 2 is being wound, the coater and the light irradiator are not used.

First, as shown in FIG. 3, the film mold 2 having the double-sided adhesive tape 8 with the separator 10 adhered thereon is arranged at the tangential line of the transferring roll 12, and then the film mold 2 with the double-sided adhesive tape 8 is inserted in between the conveying film F and the transferring roll 12 while peeling off the separator 10 in the direction shown by the arrow Y. In this state, each of the rolls is rotated in the direction as indicated by each of the arrows. The film mold 2 with the double-sided adhesive tape 8 is pressed against the transferring roll 12 by the upper stream roll 14, thereby adhering the roll adhering surface of the double-sided adhesive tape 8 onto the transferring roll 12.

By allowing each of the rolls to rotate in such condition, the film mold 2 with the double-sided adhesive tape 8 becomes entirely wound onto the transferring roll 12, thereby achieving the structure as shown in FIG. 4 and FIG. 5. FIG. 5 is an enlarged view of region A in FIG. 4.

As shown in FIG. 5, the double-sided adhesive tape 8 is adhered onto the entire circumference of the transferring roll 12, and there is substantially no gap at the butting portion 8a of both ends. Here, a narrow gap would cause no problem. At the butting portion of the both ends of the film mold 2, a gap G is provided. The length of the gap G (here, the length in the circumference direction of the roll is referred to as "length", and the length in the direction of the rotation axis of the roll is referred to as "width") is not particularly limited. For example, the length is 0.1 to 10 mm, preferably 0.5 to 5 mm.

1-2. Resin Filling Step

In this step, as shown in FIG. 6, the resin composition 22 is filled in the gap G. There is no particular limitation regarding the method for filling the resin composition 22. For example, the resin composition can be filled using a micropipette.

The resin composition 22 is a thermosetting resin or a photo-curing resin. As the resin, an acrylic resin, an epoxy resin, and a silicone resin can be mentioned. When the resin is a thermosetting resin or a photo-curing resin, the resin can be easily cured after forming the pattern, and thus it can be handled easily.

The resin composition 22 is preferably a resin containing a releasing component (hereinafter referred to as a "releasing resin"). When the releasing resin is used, adhesion of the transferring material can be prevented while imprinting of the concave-convex pattern to the transferring material is conducted without forming the releasing layer after forming the reverse pattern onto the resin composition 22. As the releasing resin, a mixture of the afore-mentioned thermosetting resin or the photo-curing resin with the releasing agent, a silicone resin such as polydimethyl siloxane (PDMS), a copolymer of acryl-based monomer and silicone-based monomer (including macromonomer), and a copolymer of acryl-based monomer and fluorine-based monomer (including macromonomer) can be mentioned for example. Here, the mixture of the thermosetting resin or the photo-curing resin with the releasing agent, and the silicone resin are preferable. Such resins are available at low cost, and can exhibit its releasing property sufficiently with respect to the transferring material, onto which the reverse pattern of the concave-convex pattern is transferred by the roll to roll method. Here, when the resin is the photo-curing resin or the thermosetting resin, the resin can be handled easily since the resin can be cured easily after forming the pattern. As the releasing agent, a silicone compound, a fluorine compound, an alkyd resin, a long-chain alkyl compound, and wax can be mentioned for example.

The upper surface of the resin composition 22 filled in the gap is preferably on the same plane as the upper surface of the reverse pattern 3, or is above the upper surface of the reverse pattern 3. When the filling amount of the resin composition 22 is too small, it becomes difficult to form the pattern substantially the same as the reverse pattern 3 onto the resin composition 22 in the following step.

1-3. Pattern Forming Step

In this step, a pattern 3a substantially the same as the reverse pattern 3 is formed onto the resin composition 22. Specifically, when the resin composition 22 is a photo-curing resin, the resin composition 22 is irradiated with light using the light irradiator 26 in a condition where the pattern adding mold 24 having a pattern substantially the same as the concave-convex pattern is pressed against the resin composition 22, as shown in FIG. 7. Accordingly, the pattern 3a substantially the same as the reverse pattern 3 is formed onto the resin composition 22, as shown in FIG. 8. The pattern adding mold 24 is preferably transparent with respect to the light for curing the resin composition 22. In such case, the resin composition 22 can be irradiated with the light through the pattern adding mold 24. The pattern adding mold 24 can be formed with a resin or quartz for example.

The pattern surface of the pattern adding mold 24 (the surface at the side of transferring roll 12) preferably has a curvature substantially the same as the transferring roll 12. In such case, the pattern 3a formed can be shaped so as to more fit with the outer circumference of the transferring roll 12. In addition, the pattern adding mold 24 is preferably a mold having flexibility as the film mold. In such case, the resin composition 22 can be cured in a condition where the pattern adding mold 24 is deformed so as to follow the shape of the outer circumference of the transferring roll 12, in order to form the pattern 3a having a shape which further fits with the outer circumference of the transferring roll 12.

There are cases where surplus resin flows and adheres to the reverse pattern 3 when the pattern adding mold 24 is pressed against the resin composition 22. The adhered surplus resin can be removed easily by providing a releasing treatment to the reverse pattern 3 beforehand, or by providing a protective treatment against exposure to light at the outer circumference of the gap G.

In a case where the resin composition 22 is not the releasing resin, it is preferable to subject the pattern 3a to a releasing treatment as described above.

By performing the described steps, an imprint mold having a continuous reverse pattern 3 throughout the entire circumference of the transferring roll 12 can be obtained.

By using such imprint mold, a concave-convex pattern can be formed continuously onto the transferring material. In a specific example, each of the rolls of the imprint apparatus shown in FIG. 4 is rotated so as to convey the conveying film F while ejecting the transferring material (photo-curing resin for example) from the coater 18, thereby coating the transferring material onto the conveying film F. The seamless imprint mold wound onto the transferring roll 12 is pressed against the transferring material, and the transferring material is irradiated with light provided from the light irradiator 20 in order to cure the transferring material in such condition. Accordingly, a concave-convex pattern can be formed continuously onto the transferring material.

2. Second Embodiment

The second embodiment of the present invention is similar with the first embodiment. As shown in FIG. 9, the second embodiment differs from the first embodiment in the point that a pattern-less region 5 having no reverse pattern 3 is provided in the film mold 2, the pattern-less region 5 being positioned at the end of the film mold 2 with respect to the winding direction.

Regarding the film mold 2 having such constitution, the length of the film mold 2 (that is, the length of the resin substrate 4) can be nearly equal with the outer circumference of the transferring roll 12 onto which the film mold 2 is wound. In such case, there would be substantially no gap at the butting portion 4a of the both ends of the resin substrate 4 when the film mold 2 is wound onto the transferring roll 12 (as shown in FIG. 10). Accordingly, when the resin composition 22 is filled into the gap G in such condition, the resin composition 22 would be filled onto the resin substrate 4 as shown in FIG. 11.

Next, by forming the pattern 3a substantially the same as the reverse pattern 3 onto the resin composition 22, the constitution as shown in FIG. 12 can be obtained.

By performing the described steps, an imprint mold having a continuous reverse pattern 3 throughout the entire circumference of the transferring roll 12 can be obtained.

As apparent from the comparison between FIG. 6 and FIG. 11, since the resin composition 22 is filled onto the resin substrate 4 in the present embodiment, the amount of the resin composition 22 can be suppressed compared with the amount of the resin composition 22 filled onto the double-sided adhesive tape 8 as shown in FIG. 6. Therefore, the manufacturing efficiency can be improved.

EXPLANATION OF SYMBOLS

2: film mold, 3: reverse pattern, 4: resin substrate, 4a: butting portion of the both ends of the resin substrate, 6: resin layer, 8: double-sided adhesive tape, 8a: butting portion of the both ends of the double-sided adhesive tape, 10: separator, 12: transferring roll, 14: upper stream roll, 16: lower stream roll, 18: coater, 20: light irradiator, 22: resin composition, 24: pattern adding mold, F: conveying film, G: gap

The invention claimed is:

1. A method for manufacturing an imprint mold, comprising:
    a winding step to wind a resin film mold onto a cylindrical transferring roll, the resin film mold being provided with a reverse pattern of a desired fine concave-convex pattern and the resin film mold being wound onto the transferring roll so that a gap without the reverse pattern is provided at a butting portion of both ends of the resin film mold;
    a resin filling step to fill a resin composition into the gap; and
    a pattern forming step to form a pattern substantially the same as the reverse pattern onto the resin composition.

2. The method of claim 1, wherein:
    the resin composition is a photo-curing resin; and
    the pattern is formed in the pattern forming step by irradiating the resin composition with light in a condition where a pattern adding mold is pressed against the resin composition, the pattern adding mold having a pattern substantially the same as the concave-convex pattern.

3. The method of claim 2, wherein:
    the pattern adding mold is transparent with respect to the light; and
    the resin composition is irradiated with the light through the pattern adding mold.

4. The method of claim 1, wherein the winding step is carried out by adhering one side of a double-sided adhesive tape onto the film mold, followed by adhering the other side of the double-sided adhesive tape onto the transferring roll.

5. The method of claim 4, wherein an end portion of the double-sided adhesive tape and an end portion of the film mold are shifted from each other with respect to a winding direction of the film mold.

6. The method of claim 1, wherein the resin composition is a releasing resin.

7. An imprint mold, comprising:
    a cylindrical transferring roll; and
    a resin film mold wound onto the transferring roll, the resin film mold being provided with a reverse pattern of a desired fine concave-convex pattern; wherein
    the film mold is wound onto the transferring roll so that a gap without the reverse pattern is provided at a butting portion of both ends of the resin film mold; and
    a resin composition is filled into the gap, the resin composition being provided with a pattern substantially the same as the reverse pattern.

8. An imprint mold manufacturing kit, comprising:
    a resin film mold provided with a reverse pattern of a desired fine concave-convex pattern;
    a resin composition filled into a gap provided when the film mold is wound onto a cylindrical roll, the gap being provided at a butting portion of both ends of the film mold; and
    a pattern adding mold to form a pattern substantially the same as the reverse pattern onto the resin composition.

* * * * *